United States Patent
Raman et al.

(10) Patent No.: US 7,788,256 B2
(45) Date of Patent: *Aug. 31, 2010

(54) MICROECONOMIC MECHANISM FOR DISTRIBUTED INDEXING

(75) Inventors: Vijayshankar Raman, San Jose, CA (US); Kavitha Ranganathan, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/871,471

(22) Filed: Oct. 12, 2007

(65) Prior Publication Data

US 2008/0033911 A1 Feb. 7, 2008

Related U.S. Application Data

(63) Continuation of application No. 10/902,570, filed on Jul. 30, 2004, now Pat. No. 7,340,453.

(51) Int. Cl.
G06F 17/30 (2006.01)

(52) U.S. Cl. .................. 707/719; 707/999.003

(58) Field of Classification Search .......... 707/2–5, 707/10, 100, 103 Z–103 R, 719, 999.003; 705/1, 10, 30, 40, 400

See application file for complete search history.

(56) References Cited

U.S. PATENT DOCUMENTS

| 7,043,483 | B2 * | 5/2006 | Colace et al. | 707/10 |
| 7,065,500 | B2 * | 6/2006 | Singh et al. | 705/26 |
| 7,340,453 | B2 * | 3/2008 | Raman et al. | 707/3 |
| 2004/0267725 | A1 * | 12/2004 | Harik | 707/3 |
| 2005/0060294 | A1 * | 3/2005 | Rainey | 707/3 |

OTHER PUBLICATIONS

"An Adaptive Approach to Indexing Pervasive Data;" Castro et al.; *Proceedings of the 2nd ACM International Workshop on Data Engineering for Wireless and Mobile Access*; 2001; pp. 14-19.

* cited by examiner

*Primary Examiner*—Cheryl Lewis
(74) *Attorney, Agent, or Firm*—IP Authority, LLC; Ramraj Soundararajan; Van Nguy (57) ABSTRACT

A distributed index for discovering distributed data sources and computing resources based on predicates on attributes is provided. Proposed is a non-altruistic scheme for indexing distributed data, in which nodes are provided with incentives to cooperate in the referencing of data and the routing of search requests for indexed data. Indexed data is mapped to a dynamic routing graph, in which nodes earn credits each time they route a search request. Participatory nodes along a search request traversal continually modify local routing decisions in a manner necessary to maximize profit. Thus, routing paths as a whole are able to dynamically adapt to changing query workloads and access patterns. Dynamic adaptation also occurs by automatic load-balancing of recipients of frequently routed searches, known as "hot spots", for frequently request data, "hot items", as a result of an incentive to replicate the indexing strategy of a more profitable node.

25 Claims, 4 Drawing Sheets

MICROECONOMIC MECHANISM FOR DISTRIBUTED INDEXING

RELATED APPLICATIONS

This application is a continuation of U.S. application Ser. No. 10/902,570, filed Jul. 30, 2004.

BACKGROUND OF THE INVENTION

1. Field of Invention

The present invention relates generally to the field of distributed data indexing. More specifically, the present invention is related to an incentive mechanism for autonomously and selectively indexing distributed data and for opportunistically routing queries to such data.

2. Discussion of Prior Art

There is increasing interest in integrating data and computing resources across large-scale grids. A fundamental requirement for integration is the efficient discovery of data sources and computing resources across a distributed system. In current federation and consolidation approaches, users specify sources from which they wish to draw data by explicitly combining references to these sources in a query. Such an approach is not scalable because a query must be formed with an understanding of the contents of data sources within a relevant grid. Additionally, consolidation and federation approaches are unable to adequately provide for dynamic environments; each time a data source enters a grid, experiences a failure, or leaves the grid, overlying applications are affected. Thus, it is necessary to maintain an index of computing resources across a distributed system in order to more efficiently access data associated with these computing resources.

State-of-the-art approaches in distributed indexing schemes fall into two classes, a peer-to-peer scheme and a Lightweight Directory Access Protocol (LDAP). Current peer-to-peer research focuses on distributed hash tables (DHTs) as proposed by Stoica et al. in "Chord: A scalable peer-to-peer lookup service for internet applications" and Ratnaswamy, et al. in "A scalable content addressable network". Each proposes to hash data objects to a common address-space and form an overlay structure by each peer tracking a selected number of other peers in the system. Because data is distributed uniformly across peers, a DHT offers an average time, logarithmic with the number of peers in the network, to locate a particular data item. The approaches proposed by Stoica and Ratnaswamy are limited in that it primarily only applicable to equality predicates.

Additionally, DHTs assume a cooperative model in which peers are willing to locally store data from other peers and index data that they themselves do not necessarily need. A cooperative model is less applicable for grids involving autonomous entities as is empirically illustrated in non-patent literature by: Adar and Huberman in "Free Riding on Gnutella", Ripeanu et al. in "Mapping the Gnutella Network: Properties of Large-Scale Peer-to-peer Systems and Implications for System Design", and Saroiu, et al. in "A Measurement Study of Peer-to-Peer File Sharing Systems". Empirical data from deployed systems such as Gnutella and Kazaa show a relatively large quantity of number of "free-riders", peers who consume more resources than they contribute and peers who contribute nothing at all.

Further limiting is the randomizing nature of DHT approaches, which are designed to best accommodate uniform query access patterns. However, autonomous grids are prone to access locality. For example, a hospital cancer database in San Jose may predominantly make search requests for cancer patients in the San Francisco Bay area. However, if such a database is indexed with a DHT, it is necessary to maintain pointers to a random set of patient records, many of which may be irrelevant to a common local search pattern. Furthermore, there exists no mechanism to prioritize particular types of search requests; for example a hospital may desire preferential treatment for queries made by doctors over queries made by residents and interns.

Hierarchical LDAP directory structure approaches are also limited by a cooperative model assumption and lack of prioritization mechanism. Conceptually, range predicates can be provided and the randomized nature of indexed data can be accounted for, if an LDAP index structure is chosen with care. However, a key limitation of LDAP lies in that an appropriate index structure must be configured statically, and therefore may not match a given query workload. For instance, a database administrator may have configured an LDAP hierarchy of patient records organized first by geographic region, followed by disease, followed by ethnicity, etc. Such a hierarchy is of no support to query predicates having a different set of attributes, for example, age and symptom.

Whatever the precise merits, features, and advantages of the above cited references, none of them achieves or fulfills the purposes of the present invention.

SUMMARY OF THE INVENTION

The present invention proposes a distributed index for discovering distributed data sources and computing resources based on constraints on attributes either data sources or computing resources. Proposed is a non-altruistic scheme for indexing distributed data, in which node members of a grid environment are provided with incentives to cooperate in the indexing of data and the routing of search requests for indexed data. Indexed data is mapped to a dynamic routing graph, in which nodes earn credits each time they route a search request along a path to indexed data. Participatory nodes along a search request route continually modify routing decisions throughout the traversal to destination data in order to maximize profit, (i.e. credits earned less the cost of routing). In this manner, participatory nodes locally adjust their behavior to achieve more optimal performance, and thus, routing graphs as a whole are able to dynamically adapt to changing loads and access patterns.

Frequent search requests are routed to data indexed at a target destination, known as a "hot item", in an optimally few number of hops. Dynamic adaptation also occurs by automatic load-balancing of recipients of these frequently routed searches, known as "hot spots", as a result of an incentive to replicate the indexing strategy of member nodes residing in popular search space regions. For example, search requests issued by a node at a cancer research center might involve a commonly occurring constraint of the form, "-- diagnosis like % cancer %". The indexing scheme of the present invention would learn this template form and replicate it to lessen the number of hops taken to answer search requests originating from a cancer research center node involving the predicate "--diagnosis like \%cancer\%", at the expense of a greater number hops necessary to respond to other search requests. In this manner, the distributed index of the present invention enables autonomic evolution to suit a changing query workload.

To replicate part or all of an indexing strategy, provisions are made for changing for both predicate ranges advertised by a node and a set of references to other nodes or data objects. Since a node is allowed a set of references that is of fixed cardinality, a pointer replacement policy is specified. Pointers least referenced are deleted, so as to minimize expected profit loss. However, deleting a pointer implies that previously routed queries are to be routed through an alternate pointer referencing an alternate node, presumably having a higher cost. An alternate pointer points to either an advertised predicate range intersecting that of a pointer being deleted, or to a root node advertising "all" predicate ranges. Since it is possible for pointer range advertisements to overlap, a joint penalty of pointer deletion is determined.

With regards to a change in advertised predicate, a node beneficially changes an advertised predicate or predicate range to maximize revenue. Potential revenue to be gained from a new advertisement depends on the number of new queries received and associated cost of satisfying new queries. While it is possible to determine future cost by considering the cost of routing along an existing path of pointers, revenue is dependant on a future demand for a new advertisement. Thus, a node estimates future demand in proportion with a current demand. Given estimated demands, an advertisement range is randomly changed, with probability equal to estimated demand.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

A microeconomic distributed index of the present invention is built as a network of distributed index nodes known as Data Location Brokers (DLBs). Each DLB specializes in a subset of data objects, defined by a set of advertised predicates, in which an advertisement is a promise to search for data objects satisfying advertised predicates. Each DLB is comprised of a set of pointers referencing other DLBs; and each pointer, in turn, is comprised of an advertisement corresponding to a referenced DLB. A DLB provides results to received queries by making routing decisions, based on a consultation of an associated pointer set, for a next hop in a traversal to a requested data object. In this manner, pointers in a pointer list are chosen for traversal and recursively pass issued queries along to DLBs they reference. In satisfaction of a base case necessary for a recursive approach, a subset of DLBs is directly linked to data objects satisfying advertised predicates.

Figure 1:
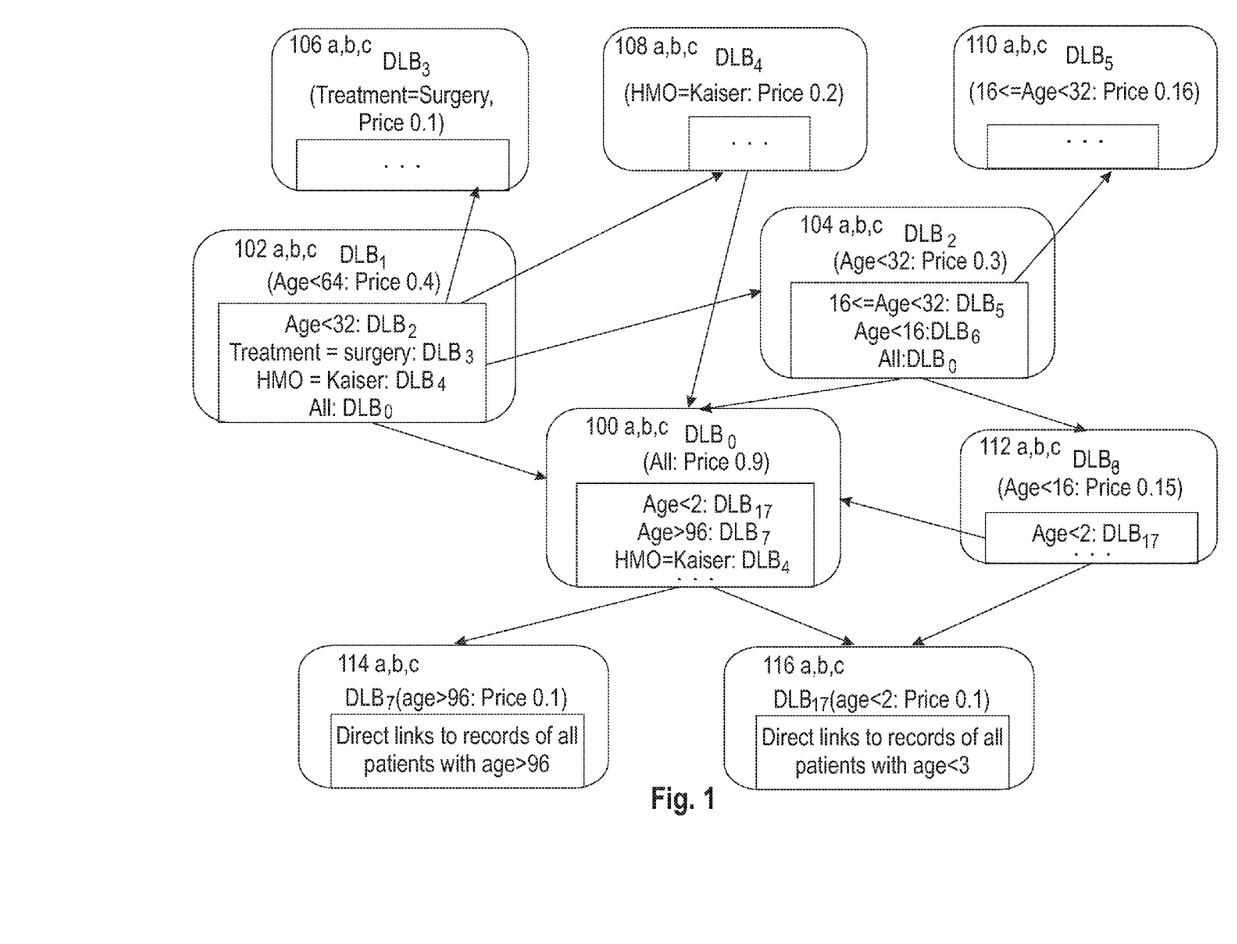
FIG. 1 illustrates a network of Data Location Brokers (DLBs) for a federation of relational databases.

Shown in FIG. 1 is an exemplary microeconomic distributed index for a federation of hospital databases. $DLB_2$ 104*a* implies a promise, through its advertisement 104*b*, to route all searches requesting records of patients less than 32 years of age, and therefore routes queries containing predicates such as age$\in$[0,24], age$\in$[16,17], and age=18. $DLB_2$ satisfies search requests containing such predicates by traversing pointers in its associated pointer set 104*c* to $DLB_5$ 110*a* and $DLB_6$ 112*a*. If $DLB_2$ 104*a* does not receive queries having a predicate outside of its promised range, for example a query with predicate age$\in$[17,47]. Note that advertisement 104*b* of $DLB_2$ 104*a* constrains search requests routed to $DLB_2$ 104*a* by other DLBs. However, any member node DLB in a distributed index is enabled originate a query, in which case it is possible for such a query issued to a DLB to be comprised of a predicate lying outside of an advertised range. Therefore, each DLB also has a special pointer to a "root node", $DLB_0$ 100, which advertises a "true" predicate (i.e., it accepts queries containing any predicate). This pointer serves as an exception handler, serving any query that is not handled by a pointer referencing another DLB. It is not necessary for root node $DLB_0$ 100 to be an actual storage center for all indexed data objects. In a first embodiment, it is a concise representation of an exhaustive, broadcast-based search.

Since an advertisement associated with a DLB is recorded in a pointer set of another DLB that references it, an advertisement follows standardized pattern. For example, a DLB advertising a promise to route searches for records of all patients having a prime number as an age is unlikely to be referenced by other DLBs, unless other DLBs are able to compute the notion of primeness and there exists a concise representation for primeness. For DLBs shown in FIG. 1, predicates are advertised primarily for numerical attributes. However, $DLB_3$ 106 and $DLB_4$ 108 advertise equality predicates involving categorical attributes. $DLB_1$ 100 and root $DLB_0$ 102 advertise predicates comprised of both numerical and categorical attributes.

Local Incentive for Routing Queries

Advertisement for a DLB is comprised of a set of predicates that are contained in a subset of received search requests DLB is enabled to route, and a cost associated with routing requests. If a DLB has direct pointers to all data objects matching the given search request, DLB provides matching data objects in direct response. Otherwise, DLB routes a search request to other DLBs as referenced by constituent pointers. By answering a given query with a direct response, DLB increases its revenue by an amount equal to an advertised price. If a DLB does not reference a data object directly, routing a query to a next hope makes a profit equal in amount to the difference between DLB's advertised price and price as charged by other DLBs to which a given search request is routed.

Figure 2:
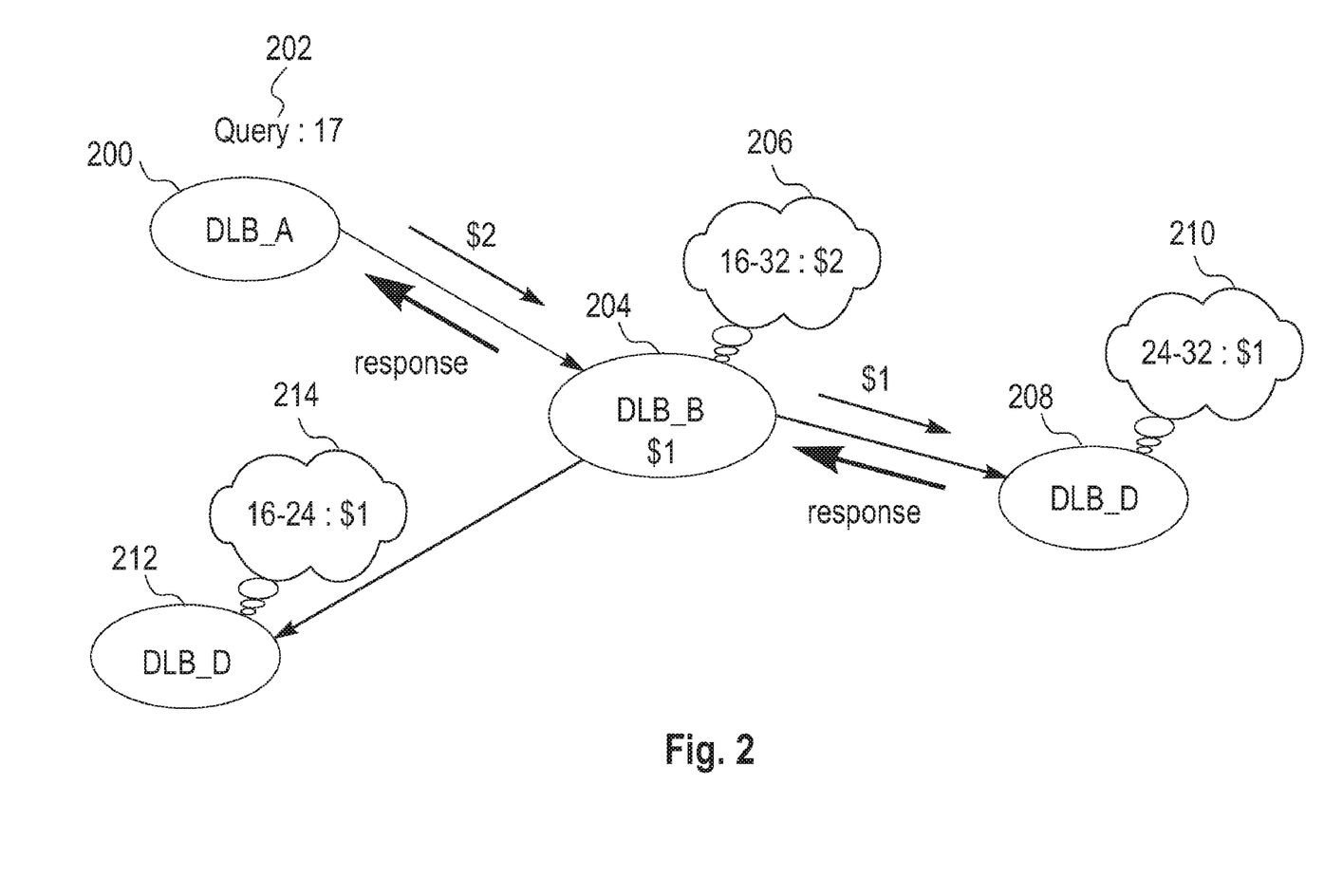
FIG. 2 illustrates a query routing flow diagram between a network of DLBs.

Referring now to FIG. 2, a plurality of DLBs is shown. DLB_A 200 receives a query 202 for all data objects having a value of 17. Since DLB_A 200 points to DLB_B 204, which in turn advertises a promise to forward search requests for data objects satisfying the predicate range 16-32 206 for a cost of $2, DLB_A 200 sends query to DLB_B 204. DLB_B 204 in turn forwards query to DLB_C 212, indexing a searched-for data object, and pays advertised price 214. DLB_B 204 subsequently forwards response received from DLB_C 212 to DLB_A 200, wherein a response is a set of data objects satisfying predicates in query. Net result of the exemplary transaction is $2 paid by DLB_A 200, equally distributed between DLB_B 204 and DLB_C 212, in payment for a response to query.

Local Incentive for Global Load-Balancing

In an ideal situation, index structure directly indexes every data object at every node, enabling a direct data object access as opposed to a search via a traversal. A constraint preventing such a situation is a limit on the number of data objects each node is willing to reference. Given a pre-determined limit on the number of data objects to a node, an index structure (i.e., a set of pointers at each index node) is chosen such that an average number of hops taken per traversal to a data object, weighted with respect to advertised cost, is minimized. Additionally, a pre-determined limit is chosen such that load-balancing avoids making any single node receive a disproportionately high amount of traffic and becoming a hot spot. Such global goals are achieved by providing an index node with an incentive to route search requests across a distributed system in the form of revenue earned each time a request is routed.

Each node tries to periodically change DLBs referenced by its pointers so as to maximize its profits. For example, queries issued from a cancer research center may mostly involve a predicate of the form "diagnosis like *cancer*". An index node at this center would learn this predicate form and adjust references made by its pointers to decrease the number of hops taken to answer queries originating from a cancer research center node involving this predicate, at the expense of an increased number of hops to answer other queries. Such selfish, local optimization leads to globally beneficial restructurings of an entire distributed index structure as subsequently described.

Figure 3:
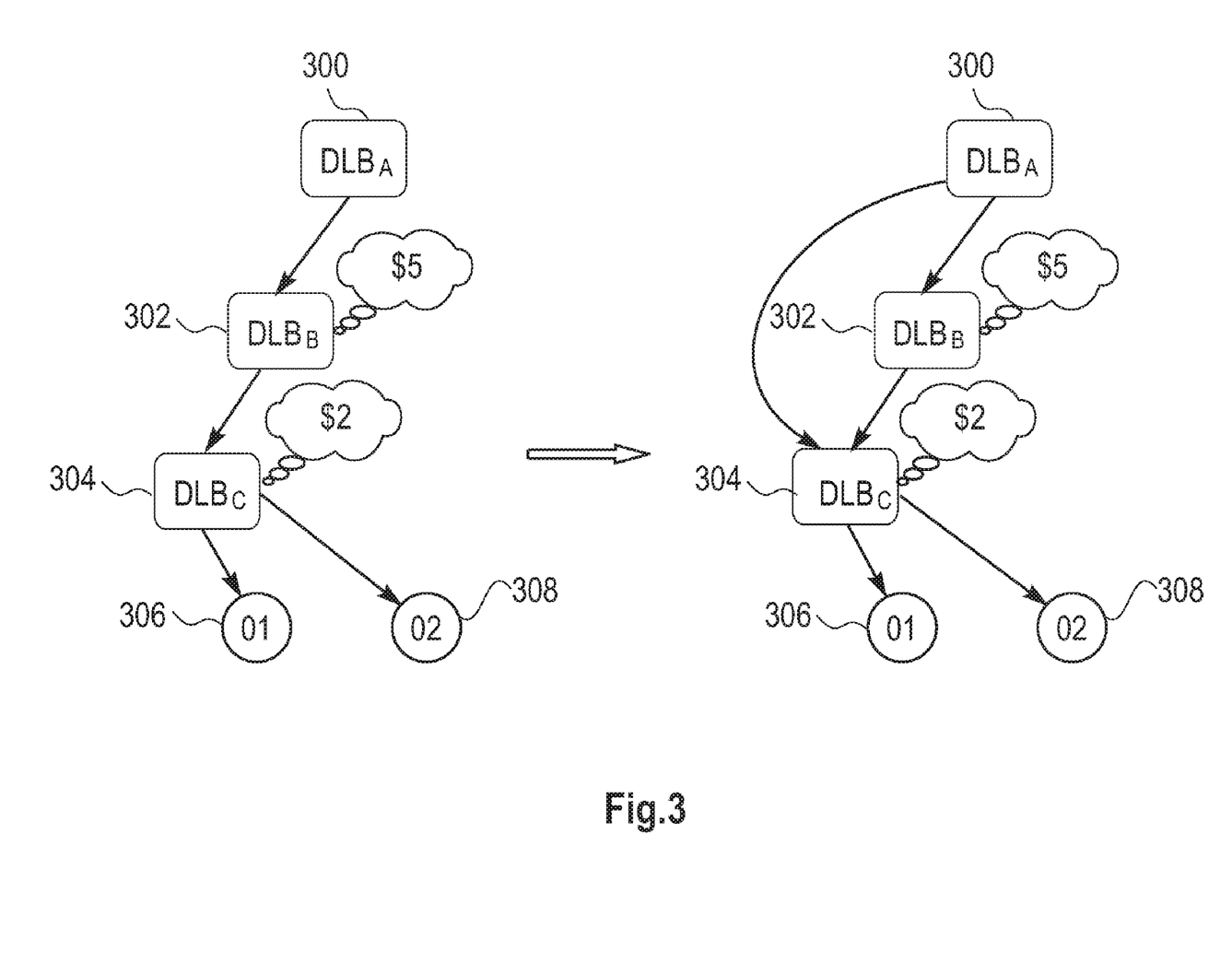
FIG. 3 illustrates an incentive mechanism for DLBs to replicate an indexing strategy that references hot items.

Referring now to FIG. 3, a search request is shown as having arrived at $DLB_A$ 300. As the number of hops taken in routing a request increases, $DLB_A$ 300 distributes an increasing amount of its advertised price to a proportionately increasing number of intermediate DLBs. Thus, $DLB_A$ 300 has the motivation of sharing less of its earned revenue to decrease the average number of hops taken for incoming search requests. $DLB_A$ 300 still has a means to be partial, for example, if a particular search occurs frequently (i.e., a request for a hot item) $DLB_A$ 300 will attempt to maximize profit by learning intermediary DLBs 302, 304 and bypassing these intermediary DLBs 302, 304 by pointing directly to a requested data object 306, 308. As a result, a fewer number of hops are required of a traversal to a hot item. However, this leads to an increased number of hops necessary for accessing less frequently requested, "colder" items, because each DLB is allowed only a fixed number of pointers.

Load-balancing is achieved as an effect of the microeconomic framework of the present invention; a particular set of queries containing a given predicate range increasing in frequency of execution causes $DLB_A$ advertising a corresponding predicate range to become overloaded. Due to its increased query workload attraction, advertising DLB will begin to make substantial profits. Other DLBs, in a bid to gain a portion of revenue increasingly attracted by $DLB_A$, begin to advertise $DLB_A$'s advertised predicate range, known as a hot range. Drawing some portion of query workload away from $DLB_A$ and therefore distributes query workload amongst other DLBs. In this manner, each DLB undergoes a state transition locally benefiting profit maximization and globally benefiting load-balancing either by adjusting an associated set of pointers or adjusting an associated advertisement cost.

Replicating Indexing Strategies—Changing a Set of Pointer References

If an advertisement cost for a given index node A is fixed, then revenue earned by index node A is fixed as well, since the only variable upon which index node A's revenue depends is the workload of queries received. Thus, a profit maximization problem for index node A is equivalent to the problem of minimizing cost incurred by index node through payments made to a number of DLBs referenced by an associated set of pointers (subject to a maximum limit). A set of pointers is determined through the insertion of new pointers to a set when learning of the existence of a new DLB; and maintained by tracking utilization of existing pointers as query workload is varied and by deleting least-utilized set of pointers from the total set when there is contention for space. An index node learns about the existence of other DLBs by piggybacking onto each query response, advertisements of each participatory DLB along a query route through the index. Piggybacked advertisements differ from a general broadcast of advertisements in that, only DLBs potentially benefiting from an advertisement are provided with advertisements. This is as opposed to inundating a network with packet broadcast or flooding overhead.

Referring again to FIG. 3, a response to a query for object O1 from $DLB_A$ will contain advertisements of participatory nodes, $DLB_C$ and $DLB_B$. To ensure that piggybacking does not increase the size of a response returned to a requestor, a node maintains and piggybacks only advertisements closest to it; distance being determined by a given number of hops, known as look-ahead. Referring back to the example shown in FIG. 1, if $DLB_2$ 104 stores advertisements of DLBs one look-ahead value away, advertisements for $DLB_0$ 100, $DLB_6$ 112, and $DLB_5$ 110 would be stored. However, if $DLB_2$ 104 stored advertisements of DLBs two look-ahead values away, advertisements for $DLB_0$ 100, $DLB_6$ 112, and $DLB_5$ 110 would be stored along with advertisements for $DLB_7$ 114, and $DLB_{17}$ 116. Thus, each time a query traverses a route to a given $DLB_x$, DLBs lying en route are traversed. In this manner, the existence of a given DLB is learned through its advertisement. $DLB_x$ is therefore known as a DLB of interest for en route DLBs. $DLB_x$ is referenced by a pointer in a set associated with an en route DLB if a shorter path is provided, thereby resulting in greater profit for subsequent requests involving an equivalent predicate.

Each DLB monitors the cardinality of an associated pointer set. When an upper limit for a number of associated pointers is reached, a specified number of pointers, k, are deleted. K is specified such that after k pointers are deleted, a pointer set is reduced to an index cardinality of lowest allowable value; in other words, k is the range between an upper and lower limit on the cardinality of an associated pointer set. Pointer replacement policy is specified such that least useful pointers are deleted, so as to minimize expected profit loss. A usage weight for each pointer, usage(p), dependent on the number of times a pointer has been previously traversed, is utilized by an index node DLB to determine a subset of pointers having the most utility. In one embodiment, a usage weight metric for a pointer is specified as having an exponential decay function, which proportions more weight, and therefore more influence, to more recently-occurring queries. Please refer to Appendix B for a formal definition and explicit recitation of changing a set of pointer references at a DLB.

Deleting a pointer implies that previously routed queries are to be routed through an alternate pointer referencing a DLB demanding a higher price. An alternate pointer points to either another DLB, in which an advertised predicate range intersects that of the pointer being deleted, or a root DLB. Since it is possible for pointer range advertisements to overlap, a joint penalty of pointer deletion is determined. Table 1 illustrates advertised predicate value ranges, predicted usage metric, an associated cost of routing a search request, and a penalty of deletion specified for each pointer in an exemplary pointer set.

TABLE 1

Pointer Deletion Penalties

| Pointer | Adv. range | Predicted usage | Cost | Penalty of Deletion |
|---|---|---|---|---|
| P1 | 0-64 | 2 | $10 | 20 |
| P2 | 16-24 | 6 | $5 | 30 |
| P3 | 24-32 | 6 | $5 | 30 |
| Root | all | — | $20 | NA |

A penalty of individual deletion for each pointer is calculated as follows:

$$\begin{aligned}\text{Penalty of deletion}(p2) &= \text{usage}(p2) * \text{difference between costs of}\\ &\quad \text{current and alternate pointers}\\ &= \text{usage}(p2) * (\text{cost of least-expensive}\\ &\quad \text{pointer encompassing advertised range for}\\ &\quad p2 - \text{cost of } p2)\\ &= 6 * (\text{cost of } p1 - \text{cost of } p2)\\ &= 30\end{aligned}$$

Thus, optimal candidates for individual deletion are p1, having the least penalty of deletion, followed by either p2 or p3, both having an equivalent penalty of deletion. Upon considering a joint deletion penalty for {p1, p2}=110, as the penalty of deleting p2 is 90 if p1 is also deleted; queries previously routed through p2 are subsequently routed through root. Hence, it is more cost-effective to delete p2 and p3 with a joint deletion penalty of 60. If p1 and p2 are deleted, nodes remaining are simply root and p3. Therefore, queries that were once routed through p2 are now routed through root. Likewise, queries that were one routed through p1 are now routed through root. A joint penalty for deleting p1 and p2 is calculated as follows:

$$\begin{aligned}\text{Joint penalty of deletion for } \{p1, p2\} &= \text{usage}(p2) *\\ &\quad (\text{cost of root} - \text{cost of } p2)\\ &= 6 * (20 - 5) = 90\\ &= \text{usage}(p1) *\\ &\quad (\text{cost of root} - \text{cost of } p1)\\ &= 2 * (20 - 10) = 20\\ &= 90 + 20 = 110\end{aligned}$$

Upon considering a joint deletion penalty for {p2, p3}, as the penalty of deleting p3 if p2 is also deleted; queries previously routed through p2 and p3 are subsequently routed through root and p1. With p2 and p3 deleted, the only nodes remaining are the root and p1. Queries previously routed by p2 and p3 are now routed by p1; the range for p1 completely overlaps the ranges of both p2 and p3. The joint penalty for p2p3 is calculated as follows:

$$\begin{aligned}\text{Joint penalty of deletion for } \{p1, p2\} &= \text{usage}(p2) *\\ &\quad (\text{cost of } p1 - \text{cost of } p2) +\\ &\quad \text{usage}(p3) * (\text{cost of } p1) -\\ &\quad \text{cost of } p3)\\ &= 6 * (10 - 5) + 6 * (10 - 5)\\ &= 60\end{aligned}$$

Replicating Indexing Strategies—Determining Pointer Deletion Penalty

Figure 4:
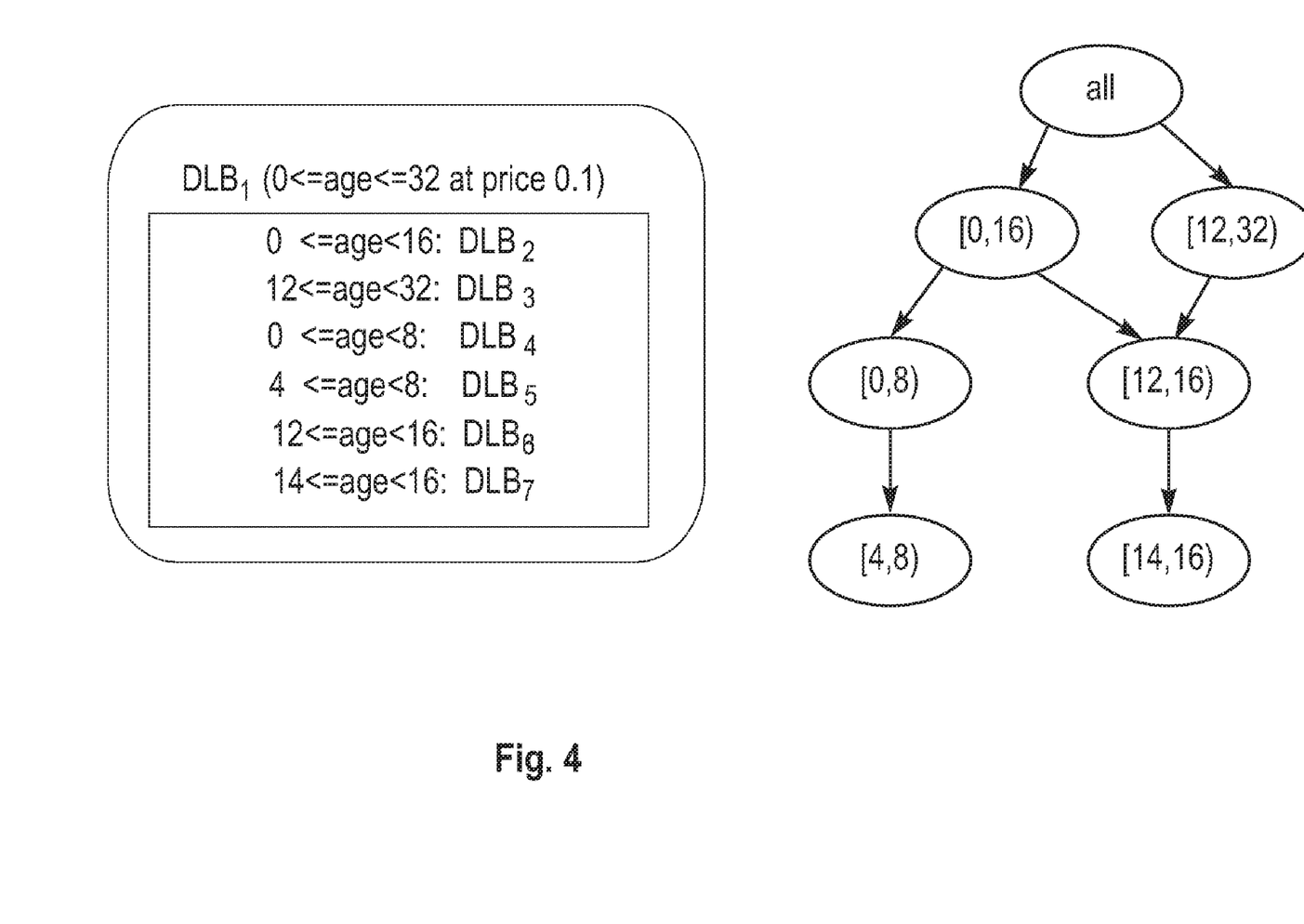
FIG. 4 illustrates a directed tree constructed from a set pointer references to replicate an advertisement strategy of a hot spot.

Determining the least useful pointers from individual and joint penalty calculations is facilitated by a recursive algorithm. In the following algorithm of the present invention, an index node is associated with a set of p pointers. Pointers in set are arranged a directed tree, wherein each pointer is represented by a node and directed edges are defined by a subsumption relation of referenced predicates. Shown in FIG. 4 is an exemplary directed tree in which root of this tree is a pointer to $DLB_0$ with advertised predicate "all". To delete a specified number of nodes from a directed tree, a recursive calculation is made for any sub-tree as follows. The root of the tree is either deleted or not deleted. If it is not deleted, then k items are to be deleted from child sub-trees $c_1, c_2, \ldots, c_m$. Penalty of deleting nodes from sub-trees of directed graph is recursively calculated as per every partition of k (or k−1 if the root is deleted). The penalty of deleting root depends on the closest ancestor whose predicate subsumes that of the root. Initially, a closest ancestor to root is $DLB_0$, but as recursion continues, $DLB_0$ is updated with another value, dependent on nodes that have been deleted. Please refer to Appendix A for a formal definition and explicit recitation of deletion penalty determination.

Replicating Indexing Strategies—Changing an Advertised Predicate Range

As discussed previously, each DLB advertises a range of predicates it promises to satisfy for incoming requests, and an associated price for satisfying those requests. Since the purpose of a DLB's advertisement is to elicit queries from other index nodes, it is beneficial for a DLB to advertise a cost that maximizes revenue. Potential revenue to be gained from a new advertisement depends on the number of new queries received, and the cost of satisfying those queries. Cost is estimated by considering the cost of routing along an existing path of pointers. However, revenue is dependant on a demand for a new advertisement; predicates for which a DLB is able to estimate demand are comprised of a currently advertised predicate and predicates advertised by an associated pointer set.

Referring now to FIG. 4, $DLB_1$ is shown comprising pointers advertising predicates satisfied by referenced DLBs. A situation is illustrated in which $DLB_1$ considers modifying currently advertised predicate of age in [0,32] to any one of the following ranges: [0-16), [12-32), [0-8), [4-8), [12-16), and [14-16). $DLB_1$ first makes an estimate of overall demand for enumerated ranges as being proportional to the number of requests it currently receives having predicates matching these ranges. $DLB_1$ then considers switching "up a level" by choosing a broader range of coarser granularity, for example 0<=age<=64, by estimating demand for a range coarser in granularity as being linearly proportionate to current demand; estimated demand is twice the amount of a current demand for a broader range, twice as large as a current predicate range. Finally, an advertisement change is randomly chosen, with a probability being equal to expected demand, from a set of possible predicate ranges. Such an estimation process involves extrapolating future demand from currently observed demand and therefore raises the possibility of lessened profits. $DLB_1$ accounts for such by storing its previous advertisement and associated demand, thus allowing DLB1 to switch back to advertising a previous advertisement if profit decreases. Please refer to Appendix C for a formal definition and explicit recitation of changing an advertisement strategy at a DLB.

Additionally, the present invention provides for an article of manufacture comprising computer readable program code implementing one or more modules to provide incentive for dynamically indexing data and computing resources. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) indexing and advertising referenced data at each DLB; (b) routing search requests for data based on an incentive to maximize the portion of search payment retained at the DLB; and (c) adaptively changing indexing and advertising strategy at each DLB to maximize profit.

CONCLUSION

A system and method has been shown in the above embodiments for the effective implementation of a microeconomic mechanism for distributed indexing. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program or computing environment.

The above enhancements are implemented in various computing environments. For example, the present invention may be implemented on a multi-nodal system (e.g., LAN) or networking system (e.g., Internet, WWW, wireless web). All programming and data related thereto are stored in computer memory, static or dynamic, and may be retrieved by the user in any of: conventional computer storage formats. The programming of the present invention may be implemented by one of skill in the art of database or object-oriented programming.

APPENDIX A

The equations below formalize deletion penalty determination for an exemplary case of deleting two child nodes.

```
Penalty (k, tree, ca)
            = B if root(tree) is not deleted
            = A if root(tree) is deleted
Where:
    k = num. of pointers to be deleted
    tree = directed tree of pointers
    ca = closest ancestor to the root of the tree present in index
A = usage(root(tree)) *
    max(0, Advertised Price of ca − Advertised price of root) +
    min {Penalty(k−1−j, left_child(tree), ca),
    Penalty(j, right_child(tree), ca) | 0 ≦ j ≦ k−1 }
B = min {Penalty(k−j, left_child(tree), X),
        Penalty(j, right_child(tree), X) | 0 ≦ j ≦ k }
X = either root(tree) or ca, whichever has lower advertised price.
```

Base cases of recursion are those in which the tree is either a leaf, or k is greater than the number of nodes in the tree and hence, eligible for deletion.

APPENDIX B

Process for Changing the Set of Pointers at Each DLB

Suppose a DLB D with pointers $p_1, p_2, \ldots p_n$ that gets a search request for object o. The algorithm for the process of changing a set of pointers at each DLB is as follows.

```
Search(o)
{
1.  If o directly matches any of p1, p2, . . . pn, say pi, return the
    object pointed to by pi
2.  Else,
        a.  find the pointer pi in p1, p2, . . . pn whose predicate has
            closest match to the search request o
        b.  Forward the search request o to the node pointed to by pi
        c.  If DLB gets a response to this search request with
            piggybacked advertisements from nodes n1, n2, . . . , nl
            where l is the length of the look-ahead.
        d.  Then add pointers to n1, n2, . . . , nl to D.
        e.  If the total number of pointers at D exceeds the maximum
            permitted, least-penalty subset of pointers is deleted
            from D to bring the total number of pointers within a
            predetermined limit.
}
```

APPENDIX C

Process for Changing the Advertisement at Each DLB

Suppose a DLB D with advertisement α has pointers to nodes with advertisements $\alpha_1, \alpha_2, \ldots \alpha_n$.

```
Advertisement_Change(D)
{
    1.  Let ρ be the average profit per search request and δ be the
        frequency of search requests at D.
    2.  For i = 1 to n do {
        Find the profit ρi per each search request if the
        advertisement is changed to αi
        Find the relative demand δi from switching to αi as the
        fraction of current search requests that are routed along αi
        }
    3.  Change advertisement to one of {α, α1, α2, . . . αn } with
        probability { ρδ, ρ1δ1, ρ2δ2, . . . , ρnδn}
}
```

The invention claimed is:

1. A method for servicing a search request over a distributed system utilizing a collection of index nodes; said method comprising:
   a. autonomously selecting, in a manner maximizing local profit, portions of said distributed system for said index nodes to index; said portions of distributed system comprising at least one of: a computing resource and a data object;
   b. iteratively routing said search request and a payment associated therewith to a participatory subset of said collection of index nodes; each iteration performed by each member of said participatory subset of index nodes, comprising:
      i. mapping said request to a target; said target being any one of: an index node in said collection, said at least one computing resource, or said at least one data object;
      ii. returning said target, if said target is not an index node in said collection;
      iii. otherwise, forwarding said search request and sharing a portion of said payment associated therewith, to said target;
   either until said target is returned or until said payment remaining is depleted.

2. A method for servicing a search request over a distributed system, as per claim 1, wherein at least one of said index nodes in said participatory subset dynamically adjusts said indexed portions of distributed system; said adjustment independent of each of said index nodes in said collection.

3. A method for servicing a search request over a distributed system, as per claim 2, wherein said distributed system is a distributed database system and said index nodes are databases.

4. A method for servicing a search request over a distributed system, as per claim 3, wherein said dynamic adjustment is performed to maximize said portion of payment retained for said search request.

5. A method for servicing a search request over a distributed system, as per claim 3, wherein said adjustment optimizes efficiency of routing said search request across said collection of index nodes.

6. A method for servicing a search request over a distributed system, as per claim 3, wherein said adjustment automatically adapts configuration of participatory subset of index nodes to evenly balance the load of routing said search request across said collection of index nodes.

7. A method for servicing a search request for over a distributed system, as per claim 3, wherein said portion of distributed system indexed by said index node is advertised a priori.

8. A method for servicing a search request over a distributed system, as per claim 2, wherein said dynamic adjustment is performed to maximize said portion of payment retained for said search request.

9. A method for servicing a search request over a distributed system, as per claim 2, wherein said adjustment optimizes efficiency of routing said search request across said collection of index nodes.

10. A method for servicing a search request over a distributed system, as per claim 2, wherein said adjustment automatically adapts configuration of said participatory subset of index nodes to evenly balance load associated with routing said search request across said collection of index nodes.

11. A method for servicing a search request for over a distributed system, as per claim 2, wherein said portion of distributed system indexed by said index node is advertised a priori.

12. A method for servicing a request over a distributed system, as per claim 1, wherein said portion of distributed system indexed by said index node is selected a priori.

13. A method for servicing a search request over a distributed system, as per claim 1, wherein said index node indexes said portion of distributed system through a set comprised of: data objects, computing resources, and index nodes.

14. A method for servicing a search request over a distributed system, as per claim 13, wherein the number of said data objects, computing resources, and index nodes dynamically indexing a portion of said distributed system is limited by a predetermined, finite number.

15. A method for servicing a search request for over a distributed system, as per claim 1, wherein said distributed system is comprised of data accessible on any of: the Internet, an internet, or an intranet.

16. A method for servicing a search request over a distributed system, as per claim 1, wherein said participatory subset, to which said search request is routed, is chosen such that routing iterations are minimized.

17. A method for servicing a search request over a distributed system, as per claim 1, wherein said participatory subset is comprised of index nodes to which previous search requests have been routed, such that said shared portion of payment is minimized.

18. An article of manufacture comprising a computer usable medium having computer readable program code embodied therein which implements servicing a search request over a distributed system; said distributed system comprising a collection of index nodes advertising and dynamically indexing a portion of said distributed system; said medium comprising modules executing:
   a. iteratively routing said search request and a payment associated therewith to a participatory subset of said collection of index nodes; each iteration performed by each member of said participatory subset, comprising:
      i. mapping said request to of a target, said target being one of: another index node in said collection of index nodes, a data object, or a least one computing resource;
      ii. returning said target, if said target is not another index node in said collection of index nodes;
      iii. otherwise, forwarding said search request and sharing a portion of said payment associated therewith, to said target;
   either until said at least one computing resource is returned or until said payment remaining is depleted.

19. A system servicing a search request over a distributed system; said system comprising:
   a. a collection of index nodes dynamically indexing a portion of said distributed system;
   b. an advertisement corresponding to each of said index nodes in said collection; said advertisement comprising: at least one predicate range describing at least one of: computing resources and data objects stored in said indexed portion and at least one corresponding cost of searching said predicate range;
   c. an iterative scheme for routing said search request and a payment associated therewith to a participatory subset of said collection of index nodes; said search request traversing index nodes of said participatory subset to reach an index node indexing either a computing resource or a data object satisfying said search request; said search request sharing said payment with said traversed index nodes;

d. a response from said index node indexing either a computing resource or a data object satisfying said search request; said response comprising: said either of a computing resource or data object; and a piggybacked advertisement for said index node; and e. a profit-maximizing adjustment to at least one of: said indexed portion of distributed system and said advertisement, based on said traversal.

20. A dynamic method for globally maximizing efficiency through localized, incentive-based routing optimization for a search request for at least one of: a computing resource and a data object; said optimization performed by each participatory node along a routing path to a node indexing said at least one of: computing resources or data objects, as a business service; said method comprised of:

a. modifying routing decisions along said routing path to maximize local profit for said participatory node; and b. routing said search requests based on said modified decision, wherein, said modification service is enabled, by a user, to occur automatically.

21. A dynamic method for globally maximizing efficiency, as per claim 20, wherein each of said participatory nodes along said routing path is comprised of: an advertisement advertising at least one predicate range describing said at least one computing resources or data objects indexed; and a corresponding cost for searching said predicate range; an index of at least one pointer to either another participatory node or a computing resource.

22. A method of dynamically balancing, as a business service, as per claim 21, wherein said modification replicates at least one of: an indexing or an advertising strategy of said participatory nodes frequently receiving a plurality of said search requests.

23. A dynamic method for globally maximizing efficiency, as per claim 22, wherein said replication maximizes profit for said participatory node replicating said strategy.

24. A dynamic method for globally maximizing efficiency, as per claim 22, wherein said plurality of frequently received search requests is routed in a minimal number of hops.

25. A economic incentive method for efficiently servicing a search request over a distributed system; said method comprising:

a. passing said search request to a plurality of nodes; said plurality of nodes forming a path to an object satisfying said search request; and b. sharing a portion of a payment for servicing said search request with each node in said plurality of nodes.

* * * * *